H. & F. H. HUMPHREY.

Shutter-Fasteners.

No. 150,955.  Patented May 19, 1874.

Witness.
Roswell O. Moore
Jeremy W. Bliss

Inventor.
Henry Humphrey
Frederick H. Humphrey

UNITED STATES PATENT OFFICE.

HENRY HUMPHREY AND FREDERICK H. HUMPHREY, OF BLOOMFIELD, CONNECTICUT.

IMPROVEMENT IN SHUTTER-FASTENERS.

Specification forming part of Letters Patent No. 150,955, dated May 19, 1874; application filed March 20, 1874.

*To all whom it may concern:*

Be it known that we, HENRY HUMPHREY and FREDERICK H. HUMPHREY, of Bloomfield, county of Hartford and State of Connecticut, have jointly invented certain new and useful Improvements in the Manufacture of Blind-Fastenings; and to enable others skilled in the art to make and use the same, we will proceed to describe, referring to the letters on the drawings, which indicate like parts in each of the figures.

Our invention consists in a skeleton socket or case, formed in one piece of metal, having a partial screw-threaded surface, by which it is secured, and a side opening is provided for the quick and easy insertion of a spring.

Figure 1:
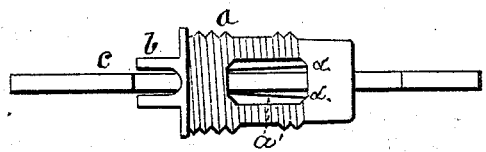
Figure 2:
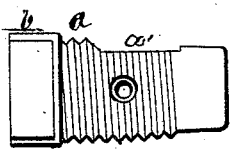
Figure 3:
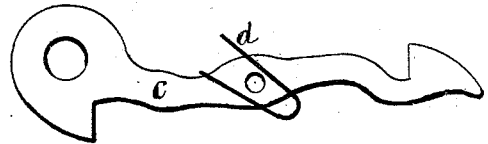

In the accompanying drawings, Figure 1 is an edge view of this invention. Fig. 2 is a side view of the case. Fig. 3 is a side view of the hook-bar and the actuating-spring.

$a$ is a skeleton socket or case formed in one piece of metal, having a partial screw-threaded surface, by which it is secured in the blind, and having an elongated projection, $b$, by which it is turned into an orifice made in the blind. This case is made skeleton form, having the usual end opening to receive the fastening hook-bar $c$, and a side opening, $a'$, for the quick and easy insertion of the spring $d$ to its place without injury to its movement, as is liable to take place when cramped through a narrow opening.

It is manufactured at a low figure, and takes but little material; it is easily adjusted; it is durable, and not liable to break.

Having thus described our invention, what we claim as new, and desire to secure by Letters Patent, is—

The screw-threaded case or shell $a$, cast in one piece of metal, and having a side opening, $a'$, for the more easy insertion of the spring, substantially as described and shown, for the purpose set forth.

HENRY HUMPHREY. [L. S.]
FREDERICK H. HUMPHREY. [L. S.]

Witnesses:
    ROSWELL A. MOORE,
    JEREMY W. BLISS.